(12) United States Patent
Cao et al.

(10) Patent No.: US 10,378,489 B2
(45) Date of Patent: Aug. 13, 2019

(54) SEALING SYSTEM AND EXHAUST GAS RECIRCULATION VALVE

(71) Applicant: CONTINENTAL AUTOMOTIVE GMBH, Hannover (DE)

(72) Inventors: Xiangguang Cao, Bobo Cheng (CN); Longsheng Zhao, Wuhu (CN); Xiaolin Du, Wuhu-Jiujiang (CN); Jingjing Song, Jiujiang District (CN)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/584,151

(22) Filed: May 2, 2017

(65) Prior Publication Data

US 2017/0234273 A1 Aug. 17, 2017

Related U.S. Application Data

(63) Continuation of application No. PCT/EP2015/076102, filed on Nov. 9, 2015.

(30) Foreign Application Priority Data

Nov. 10, 2014 (CN) .................... 2014 2 0666603 U (51) Int. Cl.
*F02M 26/50* (2016.01)
*F02M 26/67* (2016.01)
*F16K 41/04* (2006.01)

(52) U.S. Cl.
CPC ............ *F02M 26/67* (2016.02); *F02M 26/50* (2016.02); *F16K 41/04* (2013.01)

(58) Field of Classification Search
CPC ................................ F02M 26/67; F02M 26/50
See application file for complete search history.

(56) References Cited

U.S. PATENT DOCUMENTS 5,402,643 A * 4/1995 Buchanan ............... F01M 11/02
285/148.19
2003/0111798 A1* 6/2003 Yanagiguchi ......... B29C 43/006
277/500

(Continued)

FOREIGN PATENT DOCUMENTS

CN 202970959 U 6/2013
CN 203146148 U 8/2013

(Continued)

OTHER PUBLICATIONS

International Search Report and Written Opinion of the International Searching Authority dated Feb. 2, 2016 for corresponding application No. PCT/EP2015/076102.

(Continued)

*Primary Examiner* — Jacob M Amick
*Assistant Examiner* — Charles Brauch (57) ABSTRACT

A sealing system for an exhaust gas recirculation valve, the exhaust gas recirculation valve including a housing and a valve stem disposed in the housing, the sealing system being disposed between the housing and the valve stem in order to prevent exhaust gas from entering a valve body interior. The sealing system includes at least two sealing assemblies. An exhaust gas recirculation valve includes the sealing system, and the sealing system effectively prevents exhaust gas from leaking into the valve body interior, and effectively prevents carbon deposits from sticking to the valve stem or entering the valve body interior, so as to increase the lifespan and reliability of the exhaust gas recirculation valve.

12 Claims, 5 Drawing Sheets

(56) References Cited

U.S. PATENT DOCUMENTS

| | | | | |
|---|---|---|---|---|
| 2004/0135112 A1* | 7/2004 | Greeb | ............... | E21B 34/02 251/214 |
| 2005/0235973 A1* | 10/2005 | Husges | ............ | F28D 9/0031 123/568.12 |
| 2007/0194260 A1* | 8/2007 | Seiyama | ............... | F01L 3/08 251/129.15 |
| 2010/0074729 A1* | 3/2010 | Merrill | ............... | B32B 18/00 415/139 |

FOREIGN PATENT DOCUMENTS

| | | |
|---|---|---|
| CN | 203442281 U | 2/2014 |
| CN | 203627005 U | 6/2014 |
| CN | 104100418 A | 10/2014 |
| EP | 1605155 A2 | 12/2005 |
| JP | 2002285918 A | 10/2002 |

OTHER PUBLICATIONS

English translation of abstract of JP 2002-285918A.

\* cited by examiner

SEALING SYSTEM AND EXHAUST GAS RECIRCULATION VALVE

CROSS-REFERENCE TO RELATED APPLICATIONS

This application claims the benefit of PCT Application PCT/EP2015/076102, filed Nov. 9, 2015, which claims priority to Chinese Application 201420666603.0, filed Nov. 10, 2014. The disclosures of the above applications are incorporated herein by reference.

FIELD OF THE INVENTION

The present invention relates to a sealing system, in particular to a sealing system for an exhaust gas recirculation valve. The present invention also relates to an exhaust gas recirculation valve which includes the sealing system.

BACKGROUND OF THE INVENTION

During the operation of an engine, in order to reduce NOx emissions, a portion of exhaust gas is led into the air intake pipe, and mixed with fresh air or atomized gas mixture before entering the engine cylinders to undergo combustion—this is known as exhaust gas recirculation. However, if too much exhaust gas takes part in recirculation, the engine's performance will be affected. Therefore the rate of exhaust gas recirculation should be controlled, so as to lower the content of pollutants emitted by the vehicle without lowering the engine's performance.

An exhaust gas recirculation valve is generally used to regulate the exhaust gas recirculation rate. Specifically, the degree of opening of the exhaust gas recirculation valve is controlled according to the operating conditions of the engine, in order to regulate the exhaust gas recirculation rate. For example, when the engine is idling or under full load, the exhaust gas recirculation valve is closed; when the engine is under a partial load, the exhaust gas recirculation valve is opened.

The exhaust gas recirculation valve generally includes a sealing system, to prevent exhaust gas and carbon deposits from entering the valve body interior. Ingress of exhaust gas into the valve body interior will cause corrosion of internal valve members, thereby shortening the life of the exhaust gas recirculation valve. Accumulation of carbon deposits on the valve stem will cause increased resistance to movement of the valve stem or even seizure thereof.

Existing exhaust gas recirculation valve sealing systems generally only include one set of sealing elements, but this is unlikely to completely prevent exhaust gas leakage. Moreover, carbon deposits are likely to stick to the valve stem or even enter the valve body interior; as a result, valve life is reduced and valve reliability cannot be guaranteed.

SUMMARY OF THE INVENTION

One of the technical problems to be solved by the present invention is to provide a sealing system capable of effectively preventing exhaust gas from leaking into the valve body interior and effectively preventing carbon deposits from sticking to the valve stem or even entering the valve body interior, so as to increase the lifespan and reliability of the exhaust gas recirculation valve.

To this end, the present invention provides a sealing system for an exhaust gas recirculation valve, the exhaust gas recirculation valve includes a housing and a valve stem disposed in the housing, the sealing system being disposed between the housing and the valve stem in order to prevent exhaust gas from entering a valve body interior, where the sealing system includes at least two sealing assemblies.

Preferably, the sealing system includes two sealing assemblies, i.e. an upper sealing assembly and a lower sealing assembly.

Advantageously, a vent hole may be disposed on the housing between the upper sealing assembly and the lower sealing assembly, in order to discharge exhaust gas which enters a region between the upper sealing assembly and the lower sealing assembly. As components age, it is possible that a very small amount of exhaust gas will leak through the lower sealing assembly into a space between the upper sealing assembly and the lower sealing assembly. Through the provision of the vent hole, the shock caused to the upper sealing assembly by pressurized exhaust gas is reduced, thereby helping to ensure the sealing effect.

Preferably, the vent hole is disposed below and immediately adjacent to the upper sealing assembly.

Since the lower sealing assembly is closer than the upper sealing assembly to the end at which exhaust gas enters and is therefore subject to higher pressure, the lower sealing assembly may advantageously be set to have a higher compressibility than the upper sealing assembly.

Advantageously, the sealing assembly may be formed of a support ring and an O-ring fitted tightly round an outer surface of the support ring, the support ring may be made of polytetrafluoroethylene material, and the O-ring may be flexible. Due to the lubricating properties of polytetrafluoroethylene material, when the support ring is fitted closely and rigidly on the valve stem to prevent exhaust gas and carbon deposits from passing between the support ring and valve stem to enter the valve body interior, the support ring may also allow the valve stem to move up and down freely. The flexible O-ring allows a close fit between itself and an inner wall of the housing, to prevent exhaust gas and carbon deposits from passing between the O-ring and the housing to enter the valve body interior.

Advantageously, the exhaust gas recirculation valve may also include a bushing disposed around the valve stem, for guiding the valve stem during movement of the valve stem up and down; the upper sealing assembly is disposed at an upper end of the bushing and kept fixed by an upper spacer, while the lower sealing assembly is disposed at a lower end of the bushing and kept fixed by a lower spacer.

Advantageously, the sealing system may also include a carbon scraper disposed below the sealing assemblies and press-fitted in the housing.

According to an embodiment of the present invention, the carbon scraper includes a vertical cylindrical part, the vertical cylindrical part includes an upper cylindrical part and a lower cylindrical part, and the diameter of the lower cylindrical part being slightly smaller than the diameter of the upper cylindrical part, to facilitate press-fitting into the housing and scrape carbon deposits away more effectively.

Alternatively, the carbon scraper includes a vertical cylindrical part, the vertical cylindrical part having at a lower end thereof a part with reduced internal diameter. Similarly, the part with reduced internal diameter may likewise serve the functions of facilitating press-fitting into the housing and scraping carbon deposits away more effectively.

Alternatively, the carbon scraper includes a vertical cylindrical part, the vertical cylindrical part having an inverted cone shape. Similarly, the vertical cylindrical part having an inverted cone shape may likewise serve the functions of facilitating press-fitting into the housing and scraping carbon deposits away more effectively.

Preferably, the carbon scraper may also include an increased-diameter part above the vertical cylindrical part, for causing back-flow of exhaust gas entering the carbon scraper.

The present invention also relates to an exhaust gas recirculation valve, including a housing and a valve stem disposed in the housing. The exhaust gas recirculation valve also includes a sealing system as described above, disposed between the housing and the valve stem.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

A sealing system according to embodiments of the present invention and an exhaust gas recirculation valve including the sealing system are described below with reference to the accompanying drawings. In the description below, many specific details are expounded in order to give those skilled in the art a more comprehensive understanding of the present invention. However, it is obvious to those skilled in the art that the implementation of the present invention may omit some of these specific details. Furthermore, it should be understood that the present invention is not limited to the specific embodiments presented. On the contrary, consideration may be given to using any combination of the features and key elements below to implement the present invention, regardless of whether they relate to different embodiments. Therefore the aspects, features, embodiments and advantages below serve merely an illustrative purpose, and should not be regarded as key elements or limitations of the claims, unless explicitly set out in the claims.

The structure and function of the sealing system are described in detail below with reference to particular embodiments of the exhaust gas recirculation valve.

Figure 1:
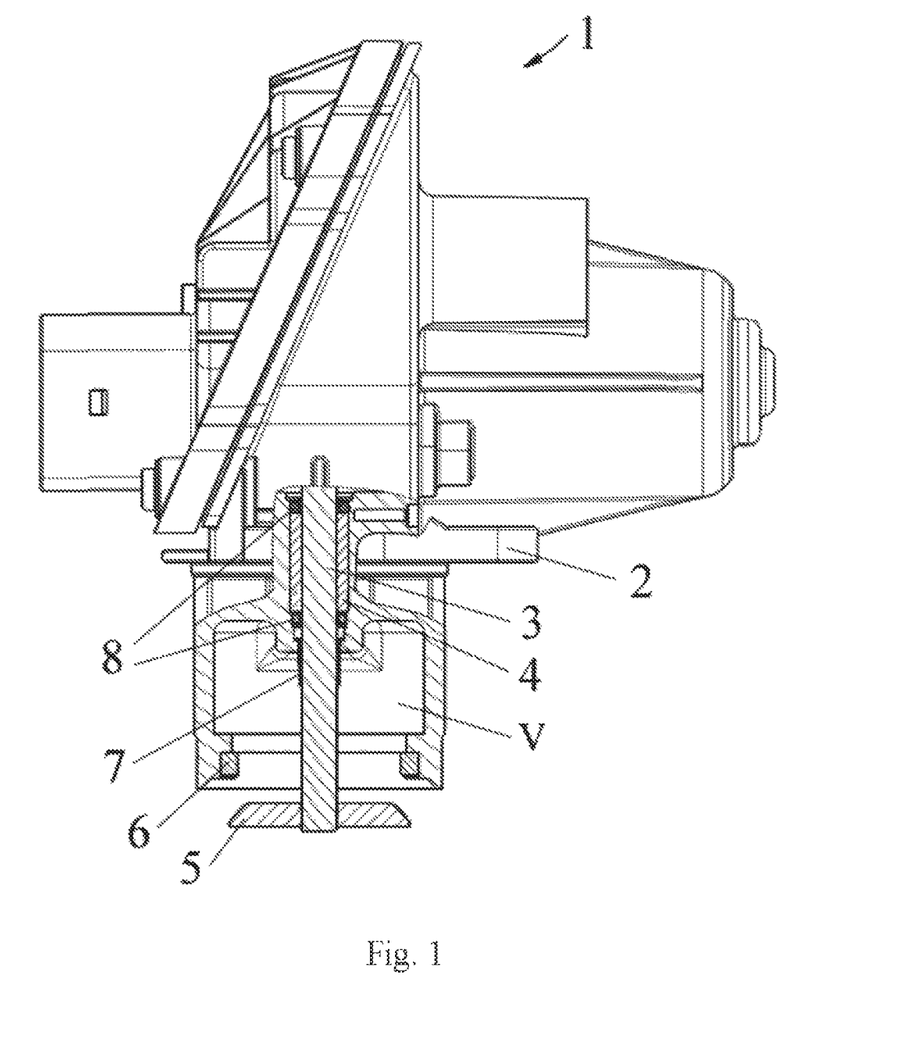
FIG. 1 is a partial section view of an exhaust gas recirculation valve, with the sealing system exposed, according to embodiments of the present invention.

As FIG. 1 shows, an exhaust gas recirculation valve 1 includes a housing 2 and a valve stem 3 disposed in the housing 2. The exhaust gas recirculation valve 1 also includes a bushing 4 disposed around the valve stem 3, for guiding the valve stem 3 during movement of the valve stem 3 up and down. A valve head 5 is disposed at a bottom end of the valve stem 3. When the valve stem 3 causes the valve head 5 to leave a valve seat 6 under the action of a drive means (not shown), exhaust gas enters a space V enclosed by the housing 2 through a gap between the valve head 5 and the valve seat 6, and then enters an air intake manifold of an engine through an opening 21 on the housing 2 (as shown by arrow A in FIG. 2), to realize exhaust gas recirculation.

Figure 2:
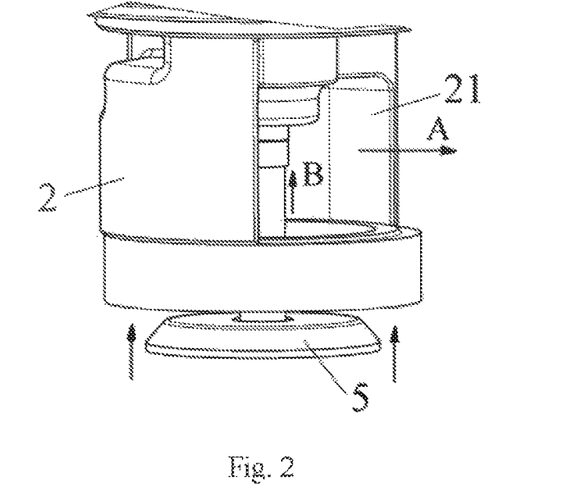
FIG. 2 is a partial perspective view of an exhaust gas recirculation valve, showing the flow path of exhaust gas according to embodiments of the present invention.
Figure 3:
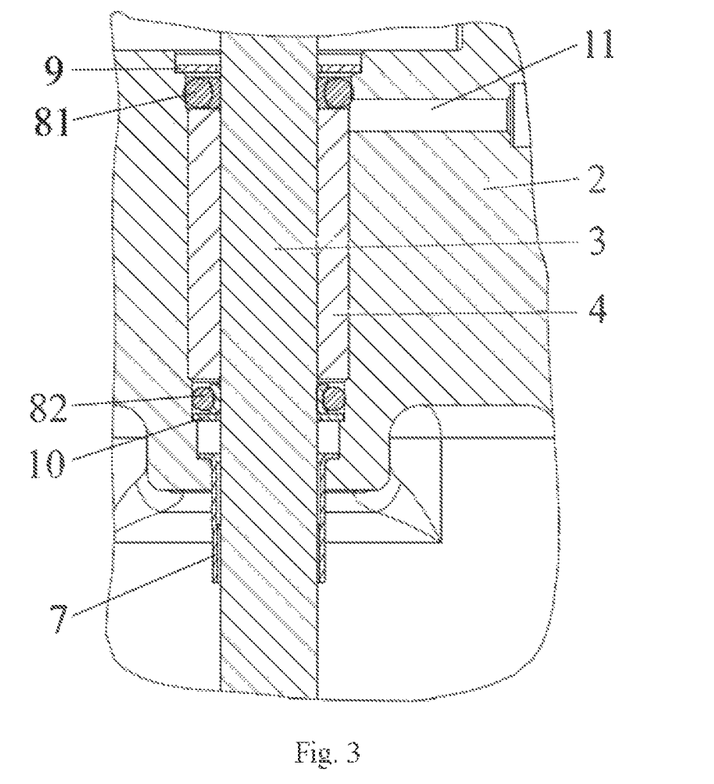
FIG. 3 is an enlarged sectional view of a sealing system, according to embodiments of the present invention.

During this process, a small amount of exhaust gas will enter a gap between a carbon scraper 7 and a valve stem 3, as shown by arrow B in FIG. 2. In order to prevent exhaust gas from then entering the valve body interior, a sealing system 8 is disposed between the housing 2 and the valve stem 3, as shown in FIGS. 1 and 3. The sealing system 8 includes an upper sealing assembly 81 and a lower sealing assembly 82. The upper sealing assembly 81 is disposed at an upper end of the bushing 4 and kept fixed by an upper spacer 9. The lower sealing assembly 82 is disposed at a lower end of the bushing 4 and kept fixed by a lower spacer 10. Optionally, a greater number of sealing assemblies may be provided.

Figure 4:
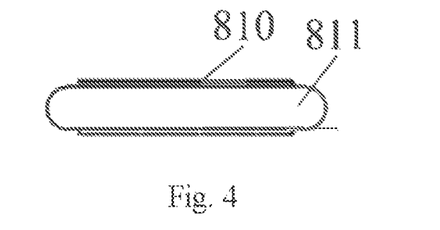
FIG. 4 is a side view of a sealing assembly used as part of a sealing system, according to embodiments of the present invention.
Figure 5:
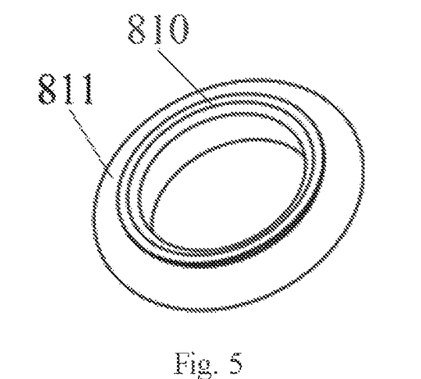
FIG. 5 is a perspective view of a sealing assembly used as part of a sealing system, according to embodiments of the present invention.

As FIGS. 4 and 5 show, the upper sealing assembly 81 and the lower sealing assembly 82 are each formed of a support ring 810 and an O-ring 811 fitted tightly round an outer surface of the support ring 810. The support ring 810 is fitted closely and rigidly on the valve stem 3, and therefore effectively prevents exhaust gas and carbon deposits from passing between the support ring 810 and valve stem 3 to enter the valve body interior. The support ring 810 is made of polytetrafluoroethylene material. Due to the lubricating properties of polytetrafluoroethylene material, the support ring 810 allows the valve stem 3 to move up and down freely. The O-ring 811 is flexible, e.g. a rubber O-ring commonly seen on the market. The O-ring 811 is fitted closely to an inner wall of the housing 2, thereby effectively preventing exhaust gas and carbon deposits from passing between the O-ring 811 and housing 2 to enter the valve body interior.

Advantageously, as FIG. 3 shows, a vent hole 11 may also be disposed on the housing 2 between the upper sealing assembly 81 and lower sealing assembly 82, to discharge any exhaust gas which might leak in from the lower sealing assembly 82. Preferably, the vent hole 11 is disposed below and immediately adjacent to the upper sealing assembly 81.

Preferably, as FIGS. 1 and 3 show, a carbon scraper 7 may be disposed below the lower sealing assembly 82, in order to scrape away, during movement of the valve stem 3 up and down, any carbon deposits which might stick to the valve stem 3, thereby preventing excessive resistance to the movement of the valve stem 3 or even seizure thereof. In order to serve the function of scraping away carbon deposits effectively, an inner wall of the carbon scraper 7 should be disposed as close as possible to the valve stem 3, but should not obstruct free movement of the valve stem 3.

Figure 6:
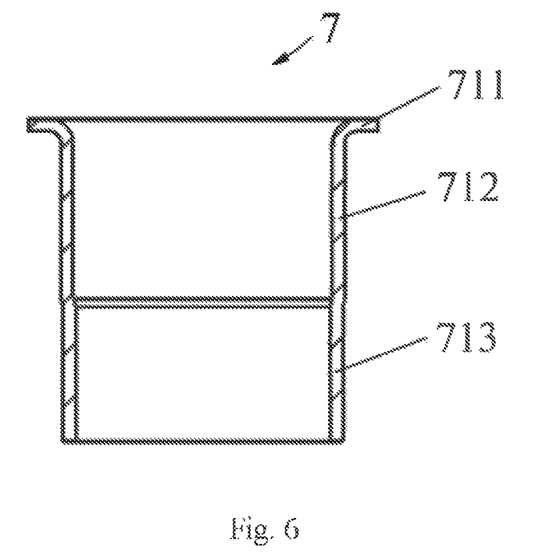
FIG. 6 is a sectional view of a carbon scraper used in an exhaust gas recirculation valve, according to embodiments of the present invention.
Figure 7:
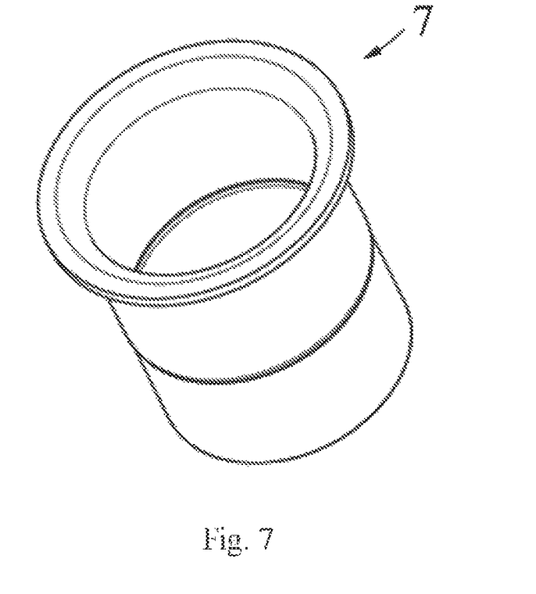
FIG. 7 is a perspective view of a carbon scraper used in an exhaust gas recirculation valve, according to embodiments of the present invention.

FIGS. 6 and 7 show a carbon scraper 7 according to an embodiment of the present invention, the carbon scraper 7 including a vertical cylindrical part. The vertical cylindrical part includes an upper cylindrical part 712 and a lower cylindrical part 713. The diameter of the lower cylindrical part 713 is slightly smaller than the diameter of the upper cylindrical part 712, to facilitate press-fitting into the housing 2 and scrape carbon deposits away more effectively. Advantageously, the carbon scraper 7 also includes an upper flange 711. The carbon scraper 7 is press-fitted in the housing 2 by means of the upper flange 711 and the upper cylindrical part 712, as FIG. 3 shows. Optionally, the vertical cylindrical part of the carbon scraper 7 may have an inverted cone shape, so as to likewise serve the functions of facilitating press-fitting into the housing 2 and scraping carbon deposits away more effectively.

Figure 8:
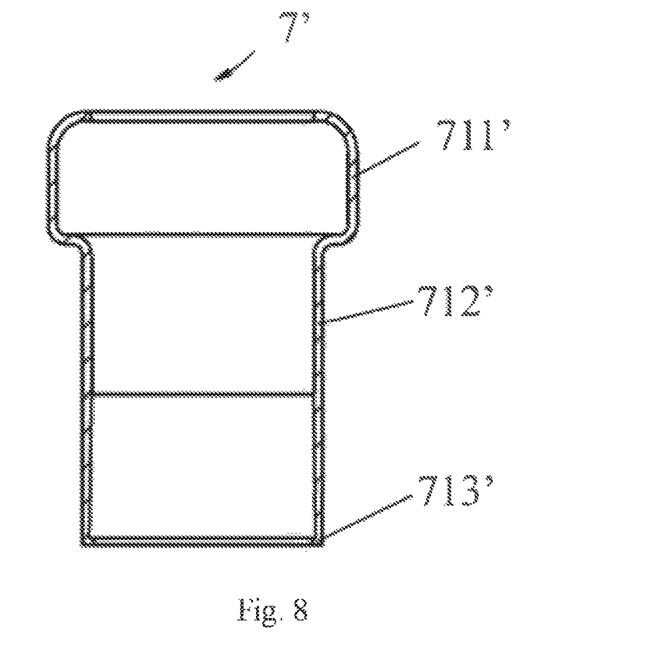
FIG. 8 is a sectional view of an alternate embodiment of a carbon scraper for an exhaust gas recirculation valve, according to embodiments of the present invention.
Figure 9:
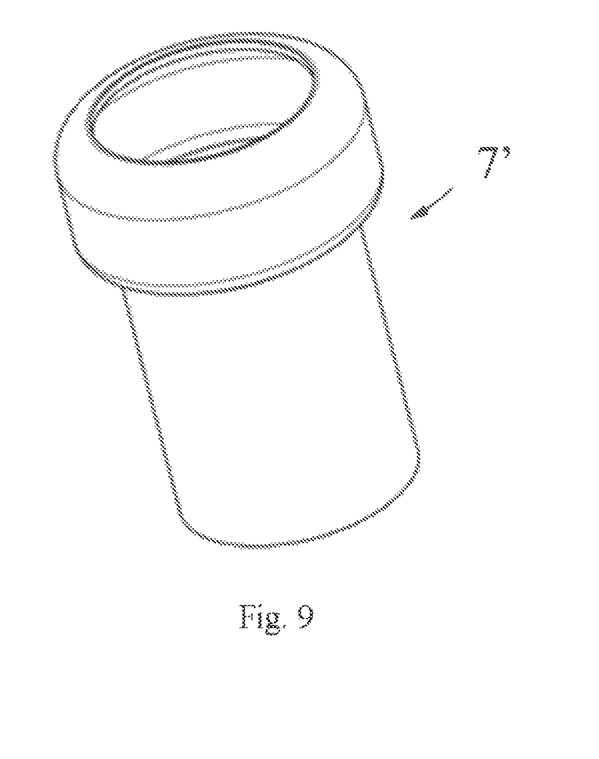
FIG. 9 is a perspective view of an alternate embodiment of a carbon scraper for an exhaust gas recirculation valve, according to embodiments of the present invention.

FIGS. 8 and 9 show a carbon scraper 7' according to another embodiment of the present invention. The carbon scraper 7' includes a vertical cylindrical part, the vertical cylindrical part having at a lower end thereof a part with reduced internal diameter 713', for scraping away any carbon deposits which might stick to the valve stem 3. Advantageously, the carbon scraper 7' is provided with an increased-diameter part 711' above the vertical cylindrical part, thereby forming a cavity relative to the valve stem 3; this enables back-flow of exhaust gas entering the carbon scraper 7', thereby reducing the pressure shock caused to the sealing assemblies by the gas flow, reducing the loss in performance of the sealing assemblies, and improving the sealing effect. Clearly, in the case of the previous embodiment of the carbon scraper, an increased-diameter part could also be disposed above the vertical cylindrical part, to enable back-flow of exhaust gas entering the carbon scraper.

As FIGS. 1 and 2 show, when the exhaust gas recirculation valve 1 is opened to allow recirculation of exhaust gas, the valve head 5 leaves the valve seat 6, and exhaust gas enters the space V enclosed by the housing 2 through the gap between the valve head 5 and valve seat 6. At this time, a small amount of exhaust gas will enter a space between the housing 2 and the lower sealing assembly 82 through the gap between the carbon scraper 7 and the valve stem 3. Due to the sealing effect of the lower sealing assembly 82, exhaust gas cannot then enter the valve body interior. However, as components age, it is possible that a very small amount of exhaust gas will leak into the space between the upper sealing assembly 81 and the lower sealing assembly 82. This very small amount of exhaust gas will be discharged from the sealing system 8 through the vent hole 11; this may reduce the shock caused to the upper sealing assembly 81 by pressurized exhaust gas. The upper sealing assembly 81 further ensures that exhaust gas is prevented from entering the valve body interior, e.g. from entering a valve drive means. According to the present invention, due to the double sealing effect of the upper sealing assembly 81 and lower sealing assembly 82, it is ensured that exhaust gas is prevented from entering the valve body interior.

Since the lower sealing assembly 82 is closer than the upper sealing assembly 81 to the end at which exhaust gas enters and is therefore subject to higher pressure, the lower sealing assembly 82 may be set to have a higher compressibility than the upper sealing assembly 81.

Although the present invention has been disclosed above by way of preferred embodiments, it is by no means limited to these. Changes and amendments of all kinds made by any person skilled in the art without departing from the spirit and scope of the present invention shall be included in the scope of protection thereof. Therefore the scope of protection of the present invention should be regarded as the scope defined by the claims.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An exhaust gas recirculation valve, comprising:
   a sealing system comprising:
   an upper sealing assembly; and
   a lower sealing assembly;
   a housing surrounding the sealing assembly;
   a valve body located in the housing;
   a valve stem extending into the housing, the valve stem surrounded by the upper sealing assembly and the lower sealing assembly;
   a bushing disposed around the valve stem, the valve stem guided by the bushing during movement of the valve stem, the bushing having an upper end and a lower end, wherein the upper sealing assembly is disposed at the upper end of the bushing, and the lower sealing assembly is disposed at the lower end of the bushing;
   an upper spacer maintaining a position of the upper sealing assembly relative to the bushing;
   a lower spacer maintaining a position of the lower sealing assembly relative to the bushing;
   a carbon scraper disposed below the lower sealing assembly, the scraper scraping carbon deposits from the valve stem during movement of the valve stem; and
   a void defined by the lower spacer and the carbon scraper;
   wherein the sealing system is disposed between the housing the valve stem, the sealing system is fitted on the valve stem preventing exhaust gas from entering an interior of the valve body.

2. The sealing system of claim 1, further comprising a vent hole integrally formed with the housing in an area of the housing between the upper sealing assembly and the lower sealing assembly, wherein the vent hole discharges exhaust gas flowing in a region between the upper sealing assembly and the lower sealing assembly.

3. The sealing system of claim 2, wherein the vent hole is disposed below and immediately adjacent to the upper sealing assembly.

4. The sealing system of claim 1, wherein the lower sealing assembly has a higher compressibility than the upper sealing assembly.

5. The sealing system of claim 1, each of the sealing assemblies further comprising:
   a support ring; and
   an O-ring;
   wherein the O-ring is fitted tightly round an outer surface of the support ring.

6. The sealing system of claim 5, wherein the O-ring is made of a flexible material.

7. The sealing system of claim 5, wherein the support ring is made of polytetrafluoroethylene material.

8. The sealing system of claim 1, wherein the carbon scraper is press-fitted in the housing, such that the carbon scraper is disposed in proximity to one of the sealing assemblies.

9. The sealing system of claim 8, wherein the carbon scraper further comprises:
   a vertical cylindrical part;

an upper cylindrical part, the upper cylindrical part being part of the vertical cylindrical part; and a lower cylindrical part, the lower cylindrical part being part of the vertical cylindrical part; and wherein a diameter of the lower cylindrical part is smaller than a diameter of the upper cylindrical part.

10. The sealing system of claim 8, wherein the carbon scraper further comprising a vertical cylindrical part having a lower end with a reduced internal diameter.

11. The sealing system of claim 8, wherein the carbon scraper further comprises a vertical cylindrical part, and the vertical cylindrical part has an inverted cone shape.

12. The sealing system of claim 8, wherein the carbon scraper further comprises:

a vertical cylindrical part; and an increased-diameter part disposed above the vertical cylindrical part;

wherein the increased-diameter part causes back-flow of exhaust gas entering the carbon scraper.

\* \* \* \* \*